INVENTOR.
LYLE E. EATON
LAWRENCE D. STRANTZ
RONALD C. KAMP
ATTORNEY

United States Patent Office
3,341,217
Patented Sept. 12, 1967

3,341,217
REGULATING MECHANISM
Lyle E. Eaton, Pekin, and Lawrence D. Strantz, Peoria, Ill., assignors to Westinghouse Air Brake Company, a corporation of Pennsylvania
Filed May 10, 1965, Ser. No. 454,619
3 Claims. (Cl. 280—6)

ABSTRACT OF THE DISCLOSURE

A mechanism for automatically leveling a vehicle having an oleopneumatic suspension unit connected between the sprung and unsprung portions of the vehicle, the mechanism comprising a hydraulic system including a valve for controlling fluid to the suspension unit for vertically adjusting the same whenever the distance between the sprung and unsprung portions is changed at a relatively low rate of change but being insensitive to such changes at a high rate of change. The mechanism further includes a bellcrank, portions of which are pivotally connected to the sprung portion, to the valve, to a lost motion assembly connected to the unsprung portion, and to a valve movement damper whereby change in the distance between the sprung and unsprung portions at a high rate of change is absorbed by the lost motion assembly without movement of the valve.

---

The present invention relates to mechanisms for regulating the static position of a suspension device, and, more particularly, to mechanisms for automatically maintaining a predetermined ground clearance and a level attitude for the cargo-carrying portion of vehicles.

In vehicles having suspension devices of the expansible chamber type, and which operate under conditions wherein the load imposed on such suspension devices varies widely, it is desirable to provide some means for maintaining a constant ground clearance for the body or cargo-carrying portion of the vehicle. In addition, because the load distribution may be unequal, causing the sprung body to cant to one side or to be depressed at one end, it is desirable to provide some means for maintaining the body in a level attitude.

It is, therefore, an object of this invention to provide a mechanism for automatically maintaining a constant ground clearance for the body of a vehicle regardless of the load carried thereby.

It is also an object of this invention to provide a mechanism for maintaining the body of a vehicle in a level attitude regardless of the load distribution within the body. It is a further object of this invention to provide a mechanism for maintaining a constant ground clearance and a level attitude which will be responsive only to the load carried by the vehicle and which will not be affected by the undulations or vertical displacements encountered in traveling over an uneven surface.

It is also an object of this invention to provide a mechanism for maintaining a vehicle body in a level attitude and with a constant ground clearance whenever the velocity of changes in such attitude and clearance are relatively low, but which is not responsive to such changes whenever the velocity thereof is relatively high.

Figure 1:
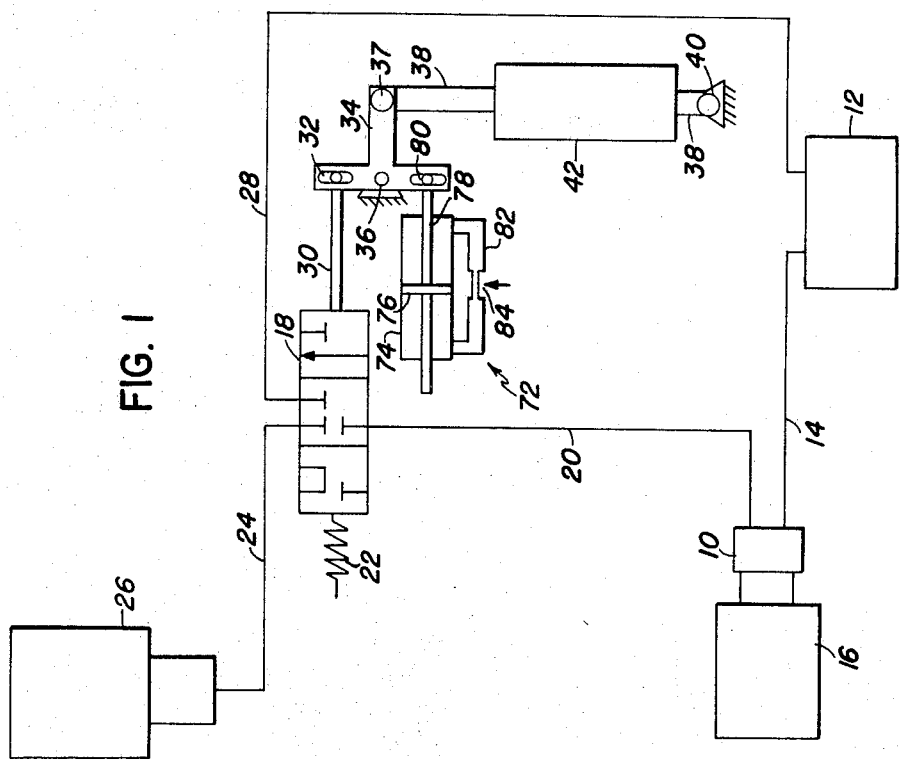
Figure 2:
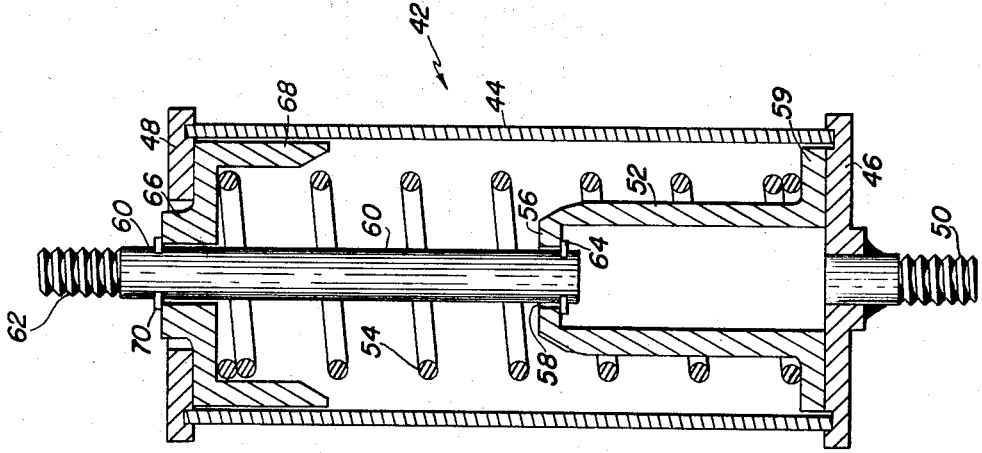

These and other objects and many of the attendant advantages will become more readily apparent from a perusal of the following description and the accompanying drawing, wherein:

FIG. 1 is a schematic diagram of the mechanism, including the hydraulic circuitry, of a preferred embodiment of the present invention; and FIG. 2 is a cross-sectional view of an embodiment of the over-travel device utilized in this invention.

Referring now to the schematic diagram of FIG. 1, a hydraulic pump 10 is supplied with hydraulic fluid from a reservoir 12 through conduit 14. The pump 10 is driven by a motor 16 and, as shown, is of the pressure compensated type. Although it is to be understood that other types of pumps would function adequately, a pressure compensated pump, which maintains pressure at a predetermined level, utilized in conjunction with a closed center control valve 18 is preferred because the physical number of hydraulic components is thereby kept to a minimum. The output from the pump is supplied to the closed center valve 18 by conduit 20. The valve 18 has three positions and is urged toward its center or neutral position by centering spring 22. While reference is made herein to the valve 18 having three positions and being movable, it will be apparent to those skilled in the art that the valve body is actually affixed to the sprung portion and the valve spool is movable within the valve body. When the valve 18 is moved to the left, as viewed in FIG. 1, the output from the pump is directed through conduit 24 to the expansible chamber suspension unit 26. This unit, which may be of the type disclosed in assignee's co-pending application Ser. No. 422,715, filed Dec. 31, 1964, is connected between the sprung and unsprung portions of the vehicle. Movement of the valve 18 to the right connects the conduit 24 with the conduit 28 which permits hydraulic fluid within the unit 26 to be exhausted to the reservoir 12. A link 30, secured to the valve 18, is pinned in a slot 32 on a T-shaped bell crank 34. The bell crank is rotatably mounted at 36 to the sprung portion or body of the vehicle, and is pivotally connected at 37 to a link 38, which link is pivotally attached at 40 to the unsprung portion of the vehicle. An over-travel or lost-motion assembly 42 is inserted in the link 38. This assembly, as best shown in FIG. 2, consists of a sleeve 44 having an end cap 46 secured to one end and an annular collar 48 secured to the other end. The cap 46 is secured to one portion of link 38 by appropriate fastening means 50. A tubular guide 52 normally abuts the cap and is slidable on the interior of the sleeve 44. The free end of the guide 52 is provided with a shoulder 56 defining an opening 58 of reduced diameter and a flange 59 is formed on the guide adjacent the cap 46. A rod 60, which is attached to the other portion of the link 38, by appropriate fastening means 62, extends through the opening 58 and is prevented from being extracted therefrom by a retaining ring 64 carried in a groove in the rod 60 and engageable with the shoulder 56. A collar 66 having an annular extension 68 is slidable within the sleeve 44 and is normally urged into engagement with the annular collar 48 by a compression spring 54 which is positioned within the sleeve between the flange 59 and the collar 66. A retaining ring 70, carried in a groove in the rod 60, engages collar 66 and makes possible the compression of spring 54 between flange 59 and collar 66 as rod 60 moves inward relative to sleeve 44. As rod 60 mores in the opposite direction relative to sleeve 44 (upward as seen in FIG. 2), ring 64 engages shoulder 56 of guide 52, again compressing spring 54 between flange 59 and collar 66. The over-travel or lost-motion assembly 42 permits the unsprung portion of the vehicle to move up and down relative to the sprung portion even though the bell crank 34 is rendered immovable. The movement of the bell crank 34 is controlled by a damper 72. The damper 72 consists basically of a cylinder 74 secured to the sprung portion with a piston 76 slidable therein and a piston rod 78 attached to the piston and extending completely through the cylinder to provide equal volume displacements for given movements in either direction. The piston rod 78 is pinned in a slot 80 formed in an arm of the bell crank 34. A conduit 82 connects both ends of the cylinder 74 in fluid communication. A variable restriction or orifice 84 is interposed in the conduit 82 and serves to restrict the flow of hydraulic fluid from one end of the cylinder to the other.

OPERATION

Assuming first that the vehicle is in a level attitude and has proper ground clearance, consideration will be given to the operation of the mechanism as the vehicle travels over a rough and uneven surface. As the surface irregularities are encountered, the unsprung portion of the vehicle will rise and fall relative to the sprung portion. The resulting upward and downward movement of link 38 will attempt to rotate the bell crank 37 about the point 36. However, this movement will be relatively rapid and rapid rotation of the bell crank 34 is not possible since rotation of the bell crank is controlled by the damper 72. The restriction 84, which is variable, can be adjusted to allow fluid flow from one end of the cylinder 74 to the other end only at the desired rate. Thus, the rapid upward and downward movement of the unsprung portion caused by irregularities in the surface will change neither the position of the bell crank 34 nor the valve 18. The movement of the unsprung portion will be absorbed in the over-travel mechanism 42 by compression of the spring 54.

Considering now the condition wherein the vehicle is at rest and is taking on an increased payload, e.g. a rail transit vehicle stopped at a station to permit the ingress of passengers, it can be seen that the load or force imposed on the suspension unit 26 is supplied gradually, i.e., at a slow rate. As the suspension unit 26 collapses under the increased weight, the sprung portion will move toward the unsprung portion, decreasing the ground clearance. The link 38 will attempt to rotate the bell crank 34 in a counter-clockwise direction, as viewed in FIG. 1. Since the load is applied slowly, the piston 76 will be moved slowly to the right, forcing fluid through the conduit 82 and the restriction 84. As the piston 76 is displaced, the bell crank will rotate, moving the valve 18 to the left and thereby directing the output from the pump 10 into the suspension unit 26, causing it to be extended. If the load is added to the vehicle suddenly, as for example, an ore-carrying truck being filled by a shovel having a dipper capacity about equal to the capacity of the truck body, the movement of the sprung portion of the vehicle relative to the unsprung portion will also be rapid, much more rapid than the damper 72 will permit. The over-travel mechanism 42 will absorb this movement by compression of the spring 54. The spring will exert a force on the link 38 urging the counter-clockwise rotation of the bell crank 34. This force will not be transient, but will continue, providing the necessary time for movement of the piston 76 and the rod 78. As the piston moves, the bell crank will be rotated, directing fluid from the pump to the suspension unit and causing it to extend. The valve will remain in this position until the suspension unit has restored the vertical distance between points 36 and 40 to what it was before the load was imposed. The link 38 will again assume the length it had under static conditions, causing the bell crank 34 to be positioned as shown in FIG. 1 and spring 22 will return the valve 18 to its center or neutral position.

Whenever a load is removed from the vehicle body, the suspension unit will be ported to tank or reservoir due to the fact that the distance between points 36 and 40 will be increased, causing the link 38 to rotate the bell crank 34 in a clockwise direction. The valve 18 will be moved to the right, exhausting the fluid in the suspension unit 26 to the reservoir 12. Resulting collapse of the unit 26 will restore the linkage mechanism to the position shown and spring 22 will return the valve 18 to its center or neutral position. Since the over-travel mechanism will operate in either direction, i.e., either sudden increase or sudden decrease in the distance between points 36 and 40 will compress the spring 54, the sudden removal of a load will result in an operation similar to the sudden application of a load, the only difference being the direction of rotation of the bell crank 34.

It can be appreciated that the installation of a plurality of such mechanisms, e.g. one at each of the four "corners" of a vehicle, will provide a system which will automatically compensate for tilting to one side or depression at one end due to an unequal load distribution within the body of the vehicle.

From the foregoing description it can be seen that the present invention provides a means for automatically maintaining a constant ground clearance or a constant elevation for a vehicle body regardless of the load carried thereby, an important feature when the vehicle body must be aligned or matched with a loading platform. In addition, this invention provides a means for automatically maintaining the body on a level plane regardless of how the load is distributed.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. A mechanism for automatically leveling a vehicle having an oleopneumatic suspension unit connected between the sprung and unsprung portions of the vehicle comprising:
   a hylraulic circuit including a reservoir and a source of hydraulic fluid under pressure;
   a bell crank pivotally mounted on said sprung portion;
   a valve in said circuit movable between a first position wherein fluid under pressure is directed to said unit for extension thereof and a second position wherein fluid in said unit is exhausted to the reservoir for collapse of said unit, said valve being pivotally attached to the bell crank;
   a link pivotally connected at one end to the bell crank and pivotally attached at the other end to said unsprung portion, whereby said valve is moved to said first position in response to decreases in the distance between said sprung and unsprung portions and to said second position in response to increases in said distance;
   damper means connected to said bell crank for controlling the rate of movement thereof; and
   lost-motion means interposed in said link for absorbing changes in distance between said sprung and unsprung portions whenever the rate of said changes exceeds the rate permitted by said damper means.

2. A mechanism according to claim 1 wherein said bell crank is T-shaped and said valve, said damper, and said link are pivotally connected to first, second, and third legs, respectively of said T-shaped bell crank.

3. A mechanism according to claim 1 wherein said damper means comprises:
a cylinder mounted on said sprung portion;
a piston slidable on the cylinder and having a rod attached thereto;
said rod extending completely through the cylinder and being connected to the bell crank;
passage means connecting the ends of the cylinder in fluid communication; and
restriction means in said passage means for restricting the flow of fluid therethrough.

References Cited

UNITED STATES PATENTS

| 2,938,736 | 5/1960 | Brown. | |
|---|---|---|---|
| 3,050,316 | 8/1962 | Behles. | |
| 3,195,877 | 7/1965 | Cislo | 280—124 |
| 3,237,958 | 3/1966 | Saftien | 280—6.1 |

LEO FRIAGLIA, *Primary Examiner.*

MILTON BUCHLER, *Examiner.*

P. GOODMAN, *Assistant Examiner.*